F. G. HODELL.
FAUCET ATTACHMENT.
APPLICATION FILED JUNE 1, 1914.
1,185,319.
Patented May 30, 1916.
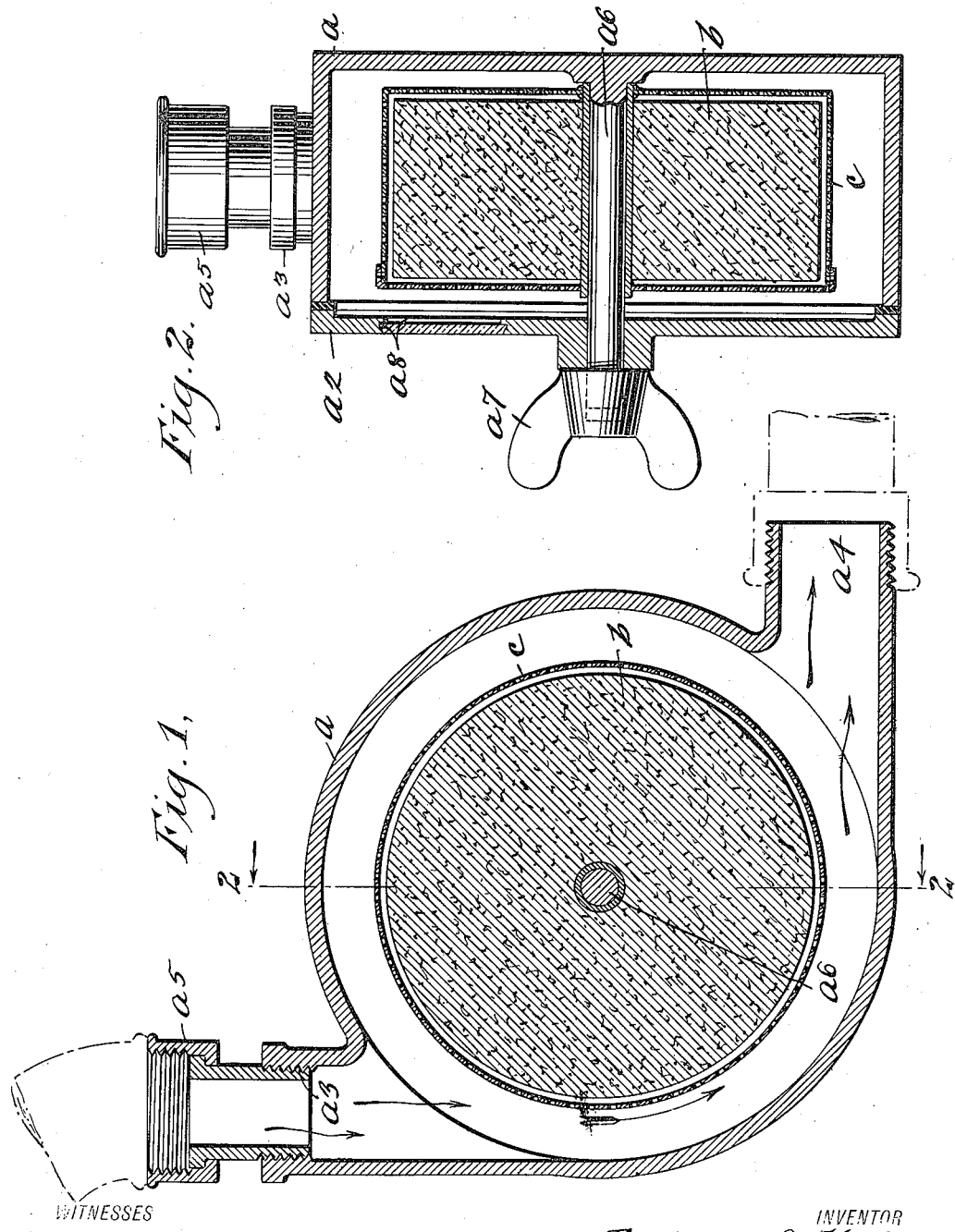

UNITED STATES PATENT OFFICE.

FREDERICK G. HODELL, OF CLEVELAND, OHIO, ASSIGNOR TO CLEVELAND GALVANIZING WORKS, OF CLEVELAND, OHIO.

FAUCET ATTACHMENT.

1,185,319.  Specification of Letters Patent.  Patented May 30, 1916.

Application filed June 1, 1914. Serial No. 842,226.

*To all whom it may concern:*

Be it known that I, FREDERICK G. HODELL, a citizen of the United States, and resident of Cleveland, in the county of Cuyahoga and State of Ohio, have invented certain new and useful Improvements in Faucet Attachments, of which the following is a specification.

My invention relates to the delivery of water under pressure at desired points, as by a hose or the like, either in a stream or as spray, and the main object thereof is to provide means in connection with the water conduit for impregnating the water with desired ingredients previous to its discharge at the end of said conduit.

A further object is to provide a containing medium for the said ingredients in the path of the water through the conduit, or previous to its admission thereto.

A further object is to so mount the said containing medium as to be revoluble in the path of water flow, whereby said water is prevented from action on but one side of said medium but, rather, acts on all sides thereof, with a consequent impregnation of the water and a uniform effect on said medium, as of wear if the medium is soluble in the manner of a cake of soap.

A further object is to so form the said medium as to compel its revolution when the water is flowing through said conduit.

A further object is to provide a suitable casing for the said medium allowing replenishing in the event of the medium being of a nature to be worn away by the action of the water thereon, or if it be in such form as to hold suitable ingredients which are gradually removed from said medium in the action of the water thereon; and a further object is to so construct the said casing as to be readily attachable to a conventional water system fixture and, if desired, to a hose or pipe.

My invention is fully set forth in the following specification, of which the accompanying drawings form a part, in which the separate parts are designated by the same reference characters in each of the views, and in which:—

Figure 1 is a side elevation of one form of my invention partly in section to show the construction; and Fig. 2 is a section taken on the line 2—2 of Fig. 1.

In the drawings forming a part of this application I have shown a casing $a$ having a detachable cover $a^2$ at one side thereof, and provided with an internally threaded inlet port $a^3$ and an externally threaded outlet port $a^4$, the former being adapted for connection with a faucet, hydrant, or the like by means of a coupling $a^5$ of any suitable form, and the latter being adapted for connection with a hose or the like, indicated in dotted lines, Fig. 1, and said casing is provided with an integral, centrally arranged shaft $a^6$ having a thumb-nut $a^7$ thereon to lock said cover to said casing.

In the form shown I provide a cake of material containing the desired ingredients, such as soap, shown at $b$ revoluble on the shaft $a^6$, and I may indent, tooth, convolute, or otherwise form the periphery of the said cake $b$, whereby the revolution of the said cake is certain and thus avoid wear thereof on one side, the wear being uniform all around the cake because of such revolution, and I also prefer to provide a glass covered opening $a^8$ in one side of the casing to make the cake visible and determine the necessity for the replenishing thereof.

While my device is applicable to uses wherein ordinary soap is employed, it is none the less adaptable to uses which require matter in solution fatal to insects or germs as for the spraying of trees, shrubs, plants, and other vegetable growths, or for disinfecting purposes, and, because of the wide possibilities of its adaptation, I do not seek to limit myself to any particular composition of the cake $b$ nor, indeed, do I limit myself to a cake at all, as I may, and will usually prefer to, provide a perforated or mesh cage $c$, for absorbent cotton or the like saturated with suitable liquids, or containing solid matter in powdered form adapted to be diffused through the water passing through the casing $a$, my intent being to supply suitably impregnated water to desired points, for various uses.

I will provide, although not shown, suitable spraying devices and, with a reservation to myself of all such desired changes as come within the scope of the following claim.

Having thus described my invention, I claim as new and desire to secure by Letters Patent:

The combination in a water system, of a casing in the path of the water, a detachable cover for one side of said casing, a shaft projecting from the opposite side of the casing and through said cover, a foraminous cage revolubly mounted with said casing on said shaft, water impregnating matter carried within the cage, and means engaging the shaft to lock the detachable cover in place.

In testimony whereof I have signed my name to this specification in the presence of two subscribing witnesses.

FREDERICK G. HODELL.

Witnesses:
HENRY H. HODELL,
WM. F. SCHNEIDER.